United States Patent
Du et al.

(10) Patent No.: US 10,860,369 B2
(45) Date of Patent: Dec. 8, 2020

(54) SELF-ADJUSTING SYSTEM FOR PRIORITIZING COMPUTER APPLICATIONS

(71) Applicant: International Business Machines Corporation, Armonk, NY (US)

(72) Inventors: Jun Y. Du, Ningbo (CN); Luo Xu Min, Beijing (CN); Guang Shi, Beijing (CN); Rui Shi, Beijing (CN); Wei Lin C W Wu, Beijing (CN); Jian C D L Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 15/403,967

(22) Filed: Jan. 11, 2017

(65) Prior Publication Data

US 2018/0196695 A1    Jul. 12, 2018

(51) Int. Cl.
*G06F 9/48* (2006.01)
*G06F 11/34* (2006.01)
*G06F 11/30* (2006.01)

(52) U.S. Cl.
CPC .......... *G06F 9/4881* (2013.01); *G06F 11/302* (2013.01); *G06F 11/3013* (2013.01); *G06F 11/3409* (2013.01); *G06F 11/3442* (2013.01); *G06F 2209/482* (2013.01)

(58) Field of Classification Search
CPC ....... G06F 3/061; G06F 21/604; H04L 47/803
See application file for complete search history.

(56) References Cited

U.S. PATENT DOCUMENTS

| 8,145,456 | B2 | 3/2012 | Cherkasova et al. |
| 8,516,198 | B2 | 8/2013 | Watson et al. |
| 9,069,615 | B2 | 6/2015 | Hackborn et al. |
| 2005/0108717 | A1* | 5/2005 | Hong .............. G06F 9/5033 718/102 |

(Continued)

OTHER PUBLICATIONS

"Understanding Android Application and Activity Lifecycles", [online], [retrieved from the Internet on Mar. 21, 2016]. Retrieved from the Internet <URL:http://www.techotopia.com/index.php/Understanding_Android_Application_and_Activity_Lifecycles>.

(Continued)

*Primary Examiner* — Lewis A Bullock, Jr.
*Assistant Examiner* — Gilles R Kepnang
(74) *Attorney, Agent, or Firm* — Law Offices of Ira D. Blecker, P.C.

(57) ABSTRACT

Prioritizing resource allocation to computer applications which includes: grouping the computer applications into groups according to an initial criteria; modifying the groups according to one or more criteria used to identify active computer applications; analyzing the groups to prioritize the groups in order of the active time of the computer applications in the groups; analyzing the computer applications in the groups to prioritize the computer applications in the groups in order of the active time of the computer applications in the groups; setting the highest priority for the computer applications that either (1) have high frequency of use, or (1) are active now; and prioritizing the computer applications according to the priority setting.

20 Claims, 5 Drawing Sheets

(56) References Cited

U.S. PATENT DOCUMENTS

| | | | | |
|---|---|---|---|---|
| 2005/0149940 A1* | 7/2005 | Calinescu et al. | G06F 9/5061 | 718/104 |
| 2007/0079021 A1* | 4/2007 | Dees et al. | G06F 3/061 | 710/40 |
| 2008/0005736 A1* | 1/2008 | Apacible et al. | G06F 9/5011 | 718/100 |
| 2008/0313639 A1* | 12/2008 | Kumar | G06F 9/4881 | 718/104 |
| 2009/0132754 A1* | 5/2009 | Riska | G06F 3/0611 | 711/103 |
| 2009/0307743 A1* | 12/2009 | Azagury et al. | G06F 21/604 | 726/1 |
| 2010/0235840 A1* | 9/2010 | Angaluri | G06F 9/4893 | 718/102 |
| 2011/0252430 A1* | 10/2011 | Chapman | G06F 9/485 | 718/107 |
| 2011/0302587 A1* | 12/2011 | Nishikawa | G06F 9/4881 | 718/103 |
| 2012/0047509 A1* | 2/2012 | Ben-Itzhak | G06F 9/50 | 718/103 |
| 2012/0137291 A1* | 5/2012 | Bacher et al. | G06F 9/45558 | 718/1 |
| 2012/0310739 A1* | 12/2012 | Watfa | G06Q 30/0267 | 705/14.58 |
| 2013/0275581 A1* | 10/2013 | Yu | H04L 67/22 | 709/224 |
| 2014/0013331 A1* | 1/2014 | Noro | G06F 9/50 | 718/103 |
| 2014/0013332 A1 | 1/2014 | Wei et al. | | |
| 2014/0019873 A1* | 1/2014 | Gupta | G06F 9/451 | 715/744 |
| 2014/0122848 A1* | 5/2014 | Easwaran | G06F 9/4881 | 712/244 |
| 2014/0241299 A1* | 8/2014 | Zhao | H04L 47/803 | 370/329 |
| 2015/0052251 A1* | 2/2015 | Ryan | H04L 41/0816 | 709/226 |
| 2015/0186179 A1* | 7/2015 | Park | G06F 9/485 | 718/103 |
| 2016/0014632 A1* | 1/2016 | Siow | H04L 5/0051 | 370/230 |
| 2016/0026503 A1* | 1/2016 | Lim et al. | G06F 9/4881 | 718/103 |
| 2016/0048412 A1* | 2/2016 | Liu | G06F 9/485 | 718/107 |
| 2017/0177406 A1* | 6/2017 | Chen | G06F 9/4831 | |
| 2017/0185788 A1* | 6/2017 | Qiu | G06F 21/566 | |
| 2018/0018084 A1* | 1/2018 | Kim | G06F 3/0488 | |
| 2018/0063264 A1* | 3/2018 | Papakostas | H04L 67/22 | |

OTHER PUBLICATIONS

X. Min et al., "Caching Strategy on Mobile Rich Media Engine", IEEE Xplore Abstract, 2010 IEEE 10th International Conference on Computer and Information Technology (CITC), Jun. 29, 2010-Jul. 1, 2010.

\* cited by examiner

SELF-ADJUSTING SYSTEM FOR PRIORITIZING COMPUTER APPLICATIONS

BACKGROUND

The present exemplary embodiments pertain to parallel running of computer applications and, more particularly, pertain to parallel running of computer applications that consume large resources wherein the computer applications are prioritized.

More and more computer applications are developed and enhanced to make peoples' lives more comfortable and wonderful. Those computer applications are more robust and easier to use. However, those enhanced computer application are at a cost of resources such as central processing unit (CPU), memory, disk and network. When users run large resource consumption applications in parallel, insufficient resources result in a processing bottle neck and system would perform slowly which would lead to bad user experiences.

BRIEF SUMMARY

The various advantages and purposes of the exemplary embodiments as described above and hereafter are achieved by providing, according to an aspect of the exemplary embodiments, a computer-implemented method of prioritizing resource allocation to computer applications comprising: grouping the computer applications into groups according to an initial, predefined criteria; modifying the groups according to one or more criteria used to identify active computer applications; analyzing the groups to prioritize the groups in order of the active time of the computer applications in the groups; analyzing the computer applications in the groups to prioritize the computer applications in the groups in order of the active time of the computer applications in the groups; setting the highest priority for the computer applications that either (1) have high frequency of use as defined by the user where the high frequency of use is measured by the computer applications run time and long active time as defined by the user where the long active time is measured by the computer applications active time, or (1) are active now; and prioritizing the computer applications according to the priority setting.

According to another aspect of the exemplary embodiments, there is provided a computer program product for prioritizing resource allocation to computer applications, the computer program product comprising a computer readable storage medium having program instructions embodied therewith, the program instructions executable by a processor to cause the processor to perform a method comprising: grouping the computer applications into groups according to an initial, predefined criteria; modifying the groups according to one or more criteria used to identify active computer applications; analyzing the groups to prioritize the groups in order of the active time of the computer applications in the groups; analyzing the computer applications in the groups to prioritize the computer applications in the groups in order of the active time of the computer applications in the groups; setting the highest priority for the computer applications that either (1) have high frequency of use as defined by the user where the high frequency of use is measured by the computer applications run time and long active time as defined by the user where the long active time is measured by the computer applications active time, or (1) are active now; and prioritizing the computer applications according to the priority setting.

According to a further aspect of the exemplary embodiments, there is provided a system for prioritizing resource allocation to computer applications comprising: a non-transitory storage medium that stores instructions; and a processor that executes the instructions to: group the computer applications into groups according to an initial, predefined criteria; modify the groups according to one or more criteria used to identify active computer applications herein analyze the groups comprises analyze the groups' history and the computer applications history at startup of the operating system or at runtime of the computer applications; analyze the groups to prioritize the groups in order of the active time of the computer applications in the groups; analyze the computer applications in the groups to prioritize the computer applications in the groups in order of the active time of the computer applications in the groups; set the highest priority for the computer applications that either (1) have high frequency of use as defined by the user where the high frequency of use is measured by the computer applications run time and long active time as defined by the user where the long active time is measured by the computer applications active time, or (1) are active now; and prioritize the computer applications according to the priority setting.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIGS. 4A, 4B and 4C illustrate three types of application analyzers for analyzing applications where

DETAILED DESCRIPTION

The exemplary embodiments provide a self-adjusting operating system for parallel running of computer applications (hereafter just "applications") that consume a large amount of resources. By analyzing a user's preferences and current applications running status, the exemplary embodiments provide a mechanism to dynamically adjust resource scheduling and make the applications run smoothly under limited resources.

More specifically, the exemplary embodiments provide a means to have applications run smoothly. The exemplary embodiments group applications, identify active applications and dynamically adjust application priority. By different priority settings, the operating system will schedule resources accordingly. According to the exemplary embodiments, "currently used" applications are defined as "active" applications and these applications are assigned the highest priority. Accordingly these active applications get enough resources to run smoothly to bring a good user experiences.

Figure 1:
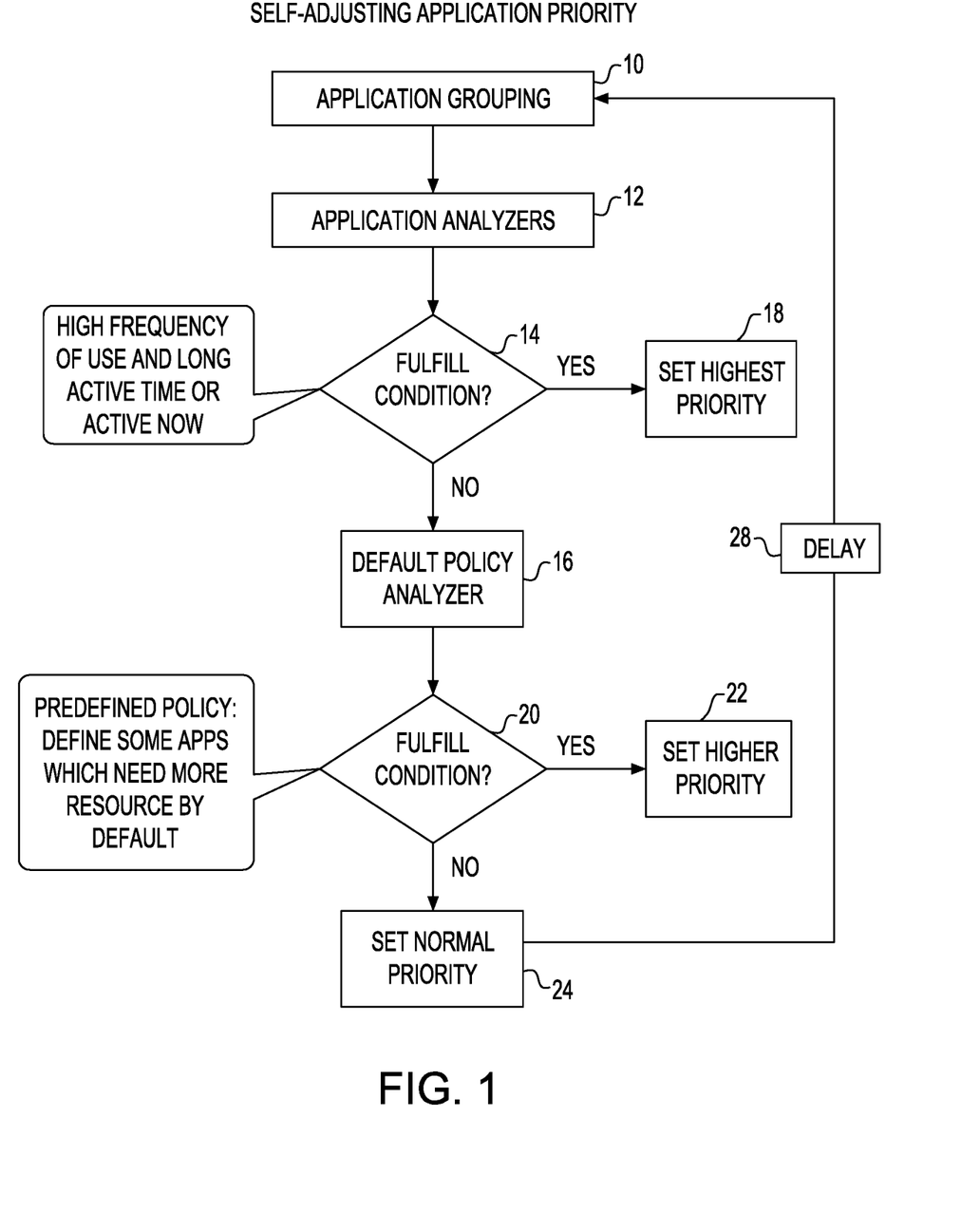
FIG. 1 illustrates a flow chart illustrating a process of the exemplary embodiments.

Referring to FIG. 1, there is a flow chart illustrating a process of the exemplary embodiments.

In a first step of the process, applications are assigned to groups, box 10. The assignment grouping process is illustrated in more detail in FIG. 2.

Figure 2:
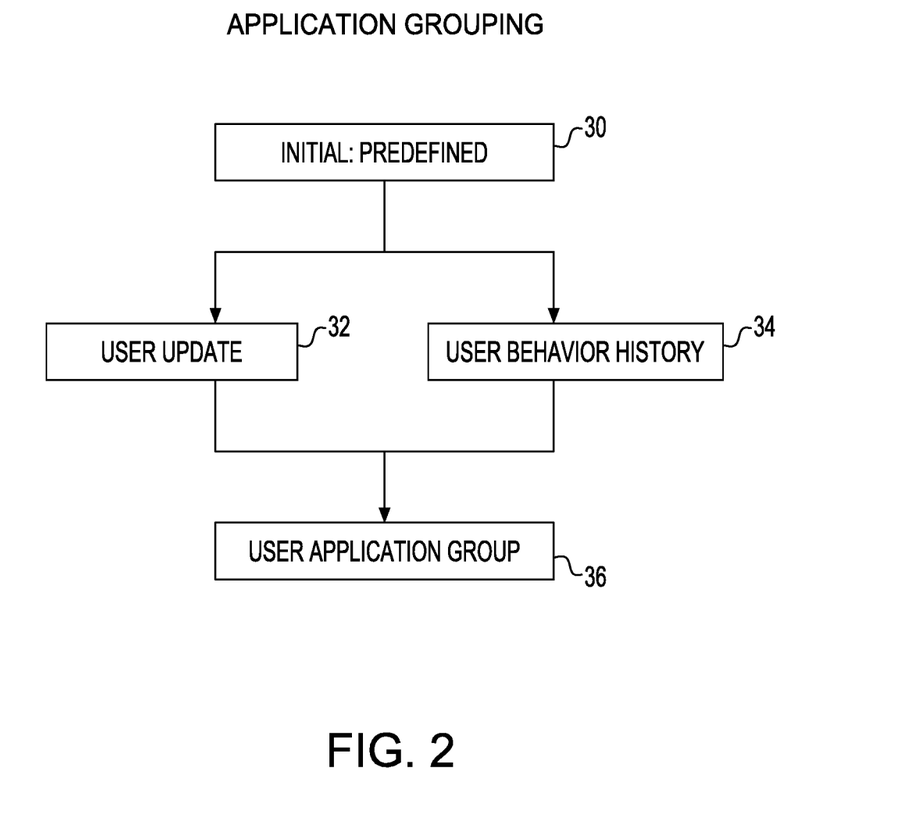
FIG. 2 illustrates the grouping of applications.

Referring now to FIG. 2, first, the applications are assigned to groups according to a predefined policy set by the user, box 30. Thereafter, the applications are updated according to the use of the applications by the user, box 32. For example, if there are three applications, say app1, app2 and app3, in a group and a new application, say app4, is always or frequently used together, then app4 may be added to the group having app1, app2 and app3. The user's behavior with respect to the applications is also monitored. For example, the system will monitor those applications frequently used by the user, box 34. Finally, the applications found from the user update, box 32, and user behavior history, box 34, may be combined into a user application group, box 36.

Figure 3:
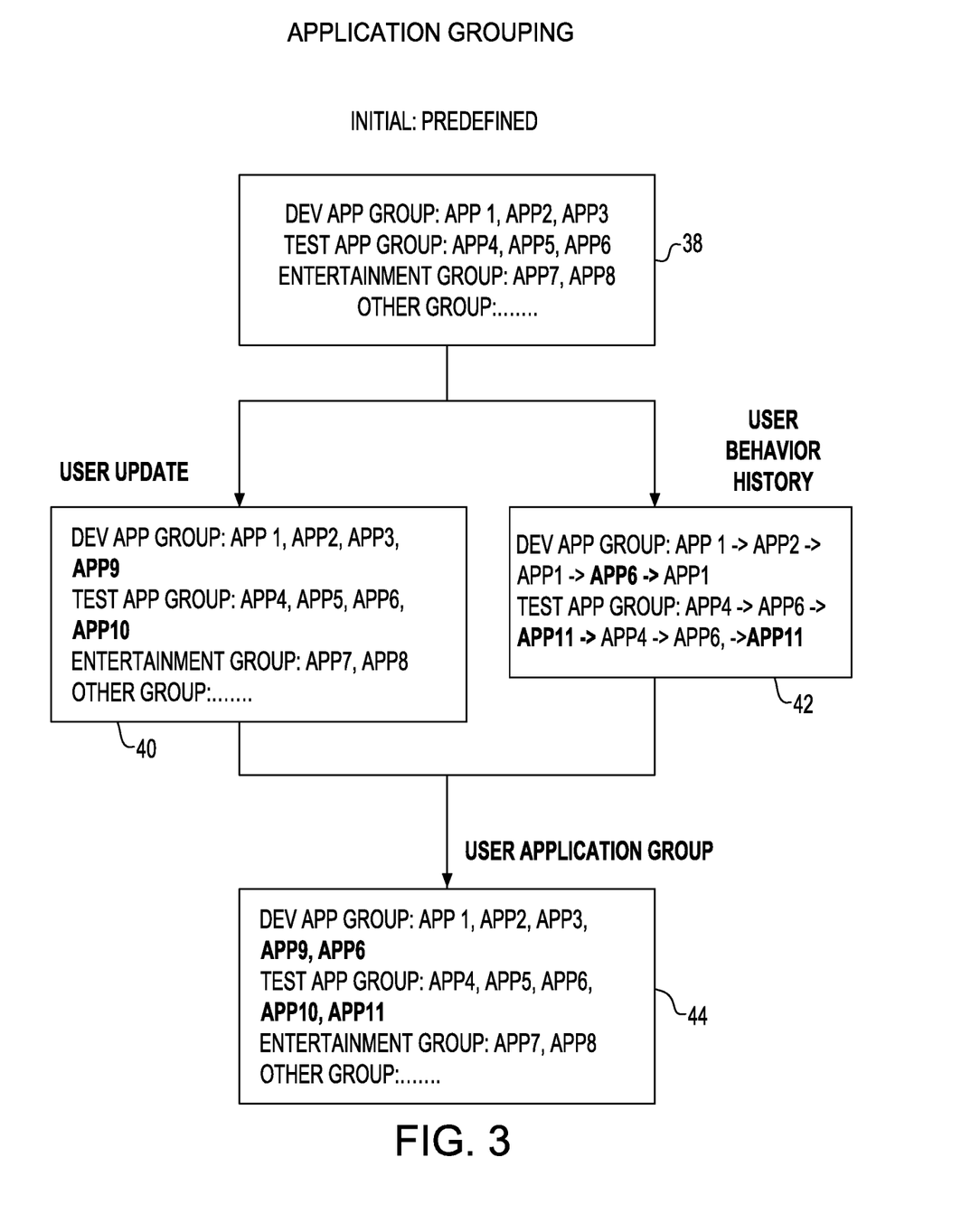
FIG. 3 illustrates a non-limiting example of application grouping.

A non-limiting example of application grouping is illustrated in FIG. 3. Application groups are initially predefined, box 38, according to the user's policy. Thus, the "Dev App Group" may include app1, app2, app3; the "Test App Group" may include app4, app5, app6; and the "Entertainment Group" may contain app7, app8.

User updates are monitored, box 40. User updates may include applications that the user may add to a group. It is noted that app9 is used with the Dev App Group and that app10 is used with the Test App Group. Criteria may be set by the user for adding an application to a group. For example, an application may be added to a group if the application is always used with the group or if the application is only sometimes by the group, as defined by the user.

The user behavior history is further monitored, box 42. It is noted that app6, although part of the Test App Group, is frequently used with the Dev App Group, It is further noted that new app11 is frequently used with the Test App Group. As with user updates, criteria may be set by the user for adding an application to a group. For purposes of illustration and not limitation, one criteria as set by the user may be the number of times in a given period of time an application is used by one of more of the other applications in the group.

User updates and user behavior history may both add applications to a group but do it differently. User updates reflect applications added by the user and user behavior history reflect updates added by applications that may be used frequently by the user. In the examples above, app9 may be manually added to the Dev App Group by the user to the user updates while app 6 may be added to the Dev App Group based on the circumstance that app6 is frequently used with the Dev App Group.

The results from the user updates, box 40, and user behavior history, box 42, are combined to result in the expanded user application group, box 44. It is noted that app9 and app6 have been added to the Dev App Group and app10 and app11 have been added to the Test App Group. It is also within the scope of the exemplary embodiments for an application to be deleted from the group if neither criteria from user updates and user behavior history are met.

Figure 4A:
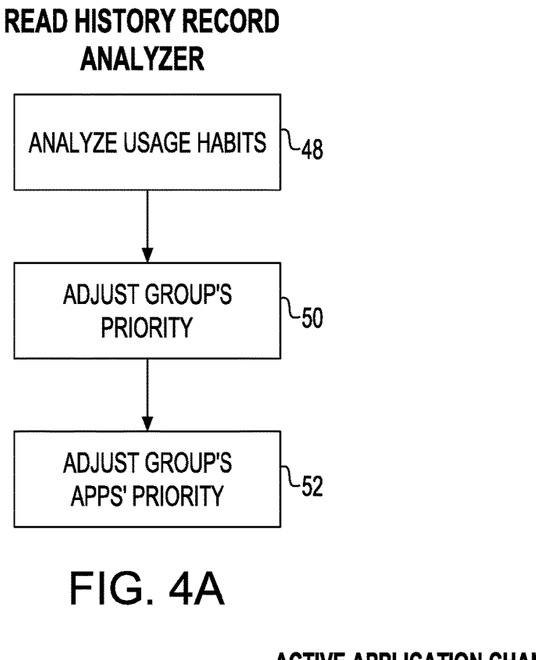
FIG. 4A is a read history record analyzers.
Figure 4B:
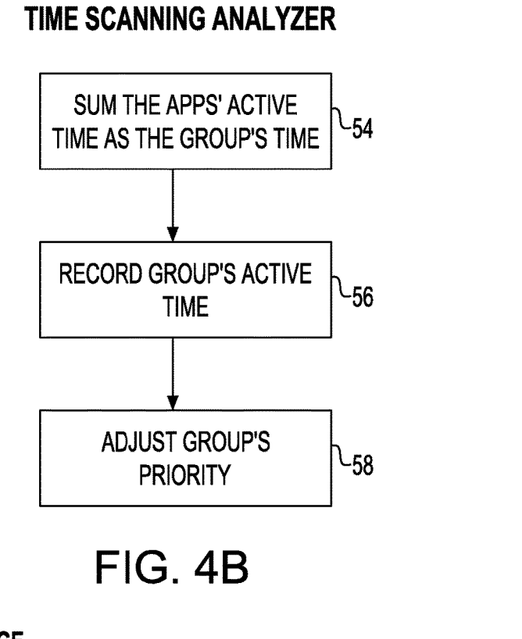
FIG. 4B is a time scanning analyzer and FIG. 4C is an active application change analyzer.
Figure 4C:
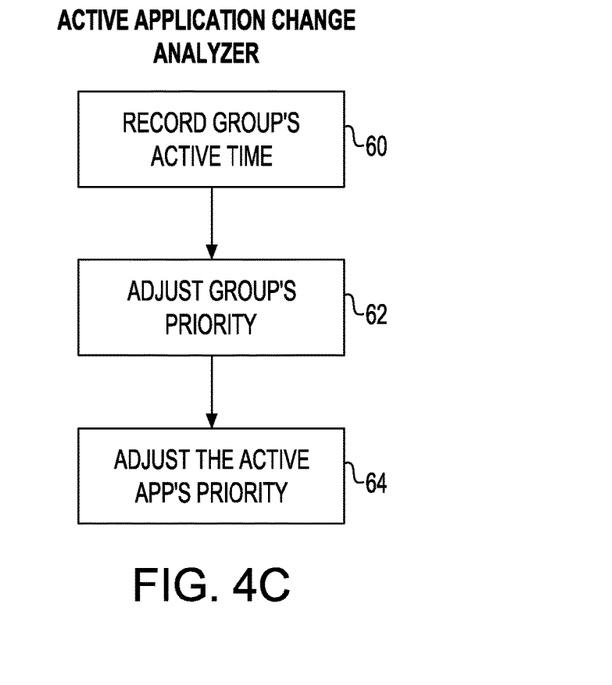

Returning back to FIG. 1, the process includes one or more application analyzers, box 12. Three application analyzers are illustrated in FIGS. 4A, 4B and 4C. The application analyzers use the previously processed application grouping in analyzing the grouping and applications within each group. The application analyzers then may change the group's priority for allocating resources and the applications' priority within each group for allocating resources.

Referring first to FIG. 4A, there is a read history record analyzer which reads the history record of the groups and the applications when the operating system is started. The read history analyzer first analyzes the usage habits of the user, box 48, and then adjusts the group's priority, box 50.

For the history record analyzer, the criteria for adjusting group priority are:

1. The result value (A) of the total run time of all applications within the group divided by the number of applications in the group. The total run time of all applications is the background run time plus the foreground run time.

2. The result value (B) of the total active time of all applications within the group divided by the number of applications in the group. The total active run time of all applications is just the foreground run time.

Final value C=A*x %+B*y % where x+y=100. "X" and "y" are default values set at 20% and 80%, respectively. The default values for "x" and "y" may be changed by the user. The greater the C value means this group will have higher priority among all groups.

Lastly, the read history analyzer adjusts the priority of the applications within the group, box 52, according to the following criteria.

1. The result value (A) of the application run time within the group for each application. The total run time of all applications is the background run time plus the foreground run time.

2. The result value (B) of the application active time within the group for each application. The total active run time of all applications is just the foreground run time.

Final value C=A*x %+B*y % where x+y=100. As noted above, the "x" and "y" are default values set at 20% and 80%, respectively. Which may be changed by the user. The greater the C value means this application will have higher priority within the group having the highest priority.

Referring now to FIG. 4B, there is illustrated a time scanning analyzer. In a first step, the time scanning analyzer sums each application's active time in the group over a predefined time interval, for example, 10 minutes, and assigns the summed active time as the group's time, box 54, and the group's active time is recorded, box 56. The group's priority is adjusted based on the group's summed active time, box 58. There may be a predefined delay between time intervals that the time scanning analyzer scans.

Referring now to FIG. 4C, there is illustrated an active application change analyzer. In a first step, the group's active time is recorded, box 60, over a predefined interval and then the group's priority is adjusted based on the group's active time, box 62. A default interval of, for example, 10 minutes may be set which may be redefined by the user. Finally, the priority of the active applications within the group are adjusted with the active applications having the highest priority, box 64.

The read history record analyzer will adjust the application group priority among all groups and the application priority within the highest priority group based on the usage history at operating system (OS) startup while the time scanning analyzer and active application change analyzer will adjust the application group priority among all groups and the application priority within the highest priority group based on the runtime behavior of the applications.

There may be some overlap between the time scanning analyzer and the active application change analyzer. However, there may be instances where one analyzer records information that the other analyzer does not record. For example, there may be an application change between time intervals that the time scanning analyzer does not record but the application change will be recorded by the active application change analyzer.

Returning back to FIG. 1, if the result of the application analyzers is that an application has (1) high frequency of use and long active time or (2) is active, the condition in box 14 is fulfilled and the process follows the "yes" path to set the highest priority for the application, box 18. The high frequency of use is defined by the application run time value where the greater the total run time value means higher frequency. The long active time is defined by the applications active (run in the foreground) time. The user may set threshold values for what is "high frequency of use" and "long active time". If either of these conditions is not met, the "no" path is followed.

The read history record analyzer in FIG. 4A will set the priority of the application on OS startup based on the application's history. After startup, the time scanning analyzer in FIG. 4B and the active application change analyzer in FIG. 4C may change the application's priority based on the application's runtime behavior.

If the condition in box 14 is not fulfilled, the "no" path is followed and proceeds to the default policy analyzer, box 16. The default policy analyzer may be used when the application is new without any application history or runtime behavior. The default policy analyzer may set the application's priority based on conditions set by the application's user. Such conditions may be priority based on a company policy or may be based on the application's usage or reputation as determined from other sources such as the internet.

In one exemplary embodiment, the default policy analyzer may set a policy that certain applications may need resource priority by default, regardless of their usage history or runtime behavior. If the condition in box 20 is fulfilled, the "yes" path is followed to set a higher priority for the application, box 22.

If the condition in box 20 is not fulfilled, the "no" path is followed and normal priority is set, box 24.

The process illustrated in FIG. 1 may be a repeatable process in which the application grouping and the prioritization of the application groups and the prioritization of the computer applications may be repeated on a continuous process or at intervals with a set delay, box 28.

It should be understood that the exemplary embodiments allocate existing resources according to the applications having the highest priority. The exemplary embodiments do not rely on just memory allocation as is common in the prior art.

Figure 5:
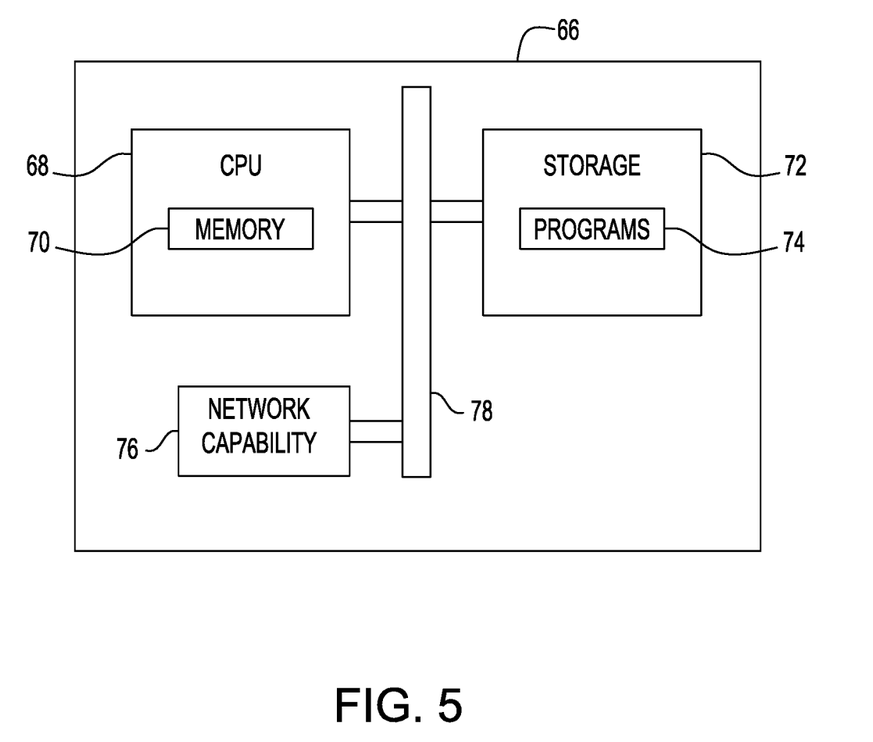
FIG. 5 illustrates a system that may embody the process of FIG. 1.

Referring now to FIG. 5, there is illustrated a system 66 which may embody the process of FIG. 1. The system 66 may include a central processing unit 68 having memory 70. The system 66 may further include a computer readable storage medium 72 which may be located within system 66 or may be located remote from system 66. The computer readable storage medium 72 may include programs 74 such as a program for implementing the process of FIG. 1. Further included within system 66 may be network capability 76, which may include for purpose of illustration and not limitation WiFi, cellular, satellite, near field communication and short range radio such as Bluetooth, for communicating with the Internet or other systems. All of the components within system 66 may be connected by a bus 78.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method of prioritizing resource allocation to a plurality of computer applications comprising:
   grouping the computer applications into groups according to an initial, predefined criteria, wherein each of the groups comprises two or more computer applications;
   modifying the groups according to one or more criteria used to identify foreground computer applications;
   for each respective application:
      determining a foreground time for the respective application;
      determining a background time for the respective application; and
      calculating a total run time by adding the foreground time and the background time for the respective application;
   for each respective group:
      calculating a total foreground time by adding the determined foreground times associated with the applications of the group;
      calculating a group total run-time by adding the calculated total run-times associated with the applications of the group; and
      calculating an average total run time by dividing the group total run time by the number of applications of the group;
   analyzing the groups to prioritize the groups in order of the total foreground time of the groups;
   subsequent to the analyzing, for each prioritized group further ordering the computer applications in its respective group by prioritizing the computer applications in the groups in order of the foreground times of the computer applications in the groups;
   setting the highest priority for the computer applications that have a highest amount of foreground time over a predetermined time interval as measured by the total run time of the computer applications and a longest foreground time over the predetermined time interval as measured by the total run time of the computer applications
   prioritizing the computer applications, according to the priority setting, while analyzing the total foreground time of all of the computer applications in the groups and analyzing the foreground time of the computer applications in the groups;
   dynamically adjusting the priority of the computer applications, according to the priority setting as determined in the prioritizing step;
   dynamically adjusting scheduling of the computer applications, according to the dynamically adjusted priority of the computer applications; and
   running the computer applications according to the dynamically adjusted scheduling of the computer applications.

2. The computer-implemented method of claim 1, wherein analyzing the groups comprises analyzing a respective history of each of the groups and a respective history of each of the computer applications at startup of an operating system, to prioritize the groups in order of a foreground time of the computer applications in the groups.

3. The computer-implemented method of claim 1, wherein analyzing the groups comprises analyzing a respective history of each of the groups and a respective history of each of the computer applications at runtime of the computer applications, to prioritize the groups in order of a foreground time of the computer applications in the groups.

4. The computer-implemented method of claim 1, wherein when the computer applications in the step of setting the highest priority do not meet the highest amount of foreground time over a predetermined time interval as measured by the total run time of the computer applications and the longest foreground time over the predetermined time interval as measured by the total run time of the computer applications further analyzing the groups and the computer applications in the group according to a default policy, and when the computer applications meet the condition of the default policy, setting the priority of the computer applications to a higher priority but less than the highest priority.

5. The computer-implemented method of claim 4, wherein when the computer applications do not meet the condition of the default policy, setting the priority of the computer applications to a normal priority but less than the higher priority and the highest priority.

6. The computer-implemented method of claim 5, wherein prioritizing the computer applications comprises scheduling computer resources to allocate the computer application according to the priority of the computer application in the order of highest priority first, higher priority second and normal priority third.

7. The computer-implemented method of claim 6, wherein the computer resources comprise a central processing unit (CPU), a memory, a disk and network resources.

8. The computer-implemented method of claim 1, wherein prioritizing the computer applications is repeated at least once.

9. A computer program product for prioritizing resource allocation to a plurality of computer applications, the computer program product comprising a non-transitory computer readable storage medium having program instructions embodied therewith, the program instructions executable by a processor to cause the processor to perform a method comprising:
  grouping the computer applications into groups according to an initial, predefined criteria, wherein each of the groups comprises two or more computer applications;
  modifying the groups according to one or more criteria used to identify foreground computer applications;
  for each respective application:
    determining a foreground time for the respective application;
    determining a background time for the respective application; and
    calculating a total run time by adding the foreground time and the background time for the respective application;
  for each respective group:
    calculating a total foreground time by adding the determined foreground times associated with the applications of the group;
    calculating a group total run-time by adding the calculated total run-times associated with the applications of the group; and
    calculating an average total run time by dividing the group total run time by the number of applications of the group;
  analyzing the groups to prioritize the groups in order of the total foreground time of the groups;
  subsequent to the analyzing, for each prioritized group further ordering the computer applications in its respective group by prioritizing the computer applications in the groups in order of the foreground times of the computer applications in the groups;
  setting the highest priority for the computer applications that have a highest amount of foreground time over a predetermined time interval as measured by the total run time of the computer applications and a longest foreground time over the predetermined time interval as measured by the total run time of the computer applications;
  prioritizing the computer applications, according to the priority setting, while analyzing the total foreground time of all of the computer applications in the groups and analyzing the foreground time of the computer applications in the groups;
  dynamically adjusting the priority of the computer applications, according to the priority setting as determined in the prioritizing step;
  dynamically adjusting scheduling of the computer applications, according to the dynamically adjusted priority of the computer applications; and
  running the computer applications according to the dynamically adjusted scheduling of the computer applications.

10. The computer program product of claim 9, wherein analyzing the groups comprises analyzing a respective history of each of the groups and a respective history of each of the computer applications at startup of an operating system, to prioritize the groups in order of a foreground time of the computer applications in the groups.

11. The computer program product of claim 9, wherein analyzing the groups comprises analyzing a respective history of each of the groups and a respective history of each of the computer applications at runtime of the computer applications, to prioritize the groups in order of a foreground time of the computer applications in the groups.

12. The computer program product of claim 9, wherein when the computer applications in the step of setting the highest priority do not meet the highest amount of foreground time over a predetermined time interval as measured by the total run time of the computer applications and the longest foreground time over the predetermined time interval as measured by the total run time of the computer applications, further analyzing the groups and the computer applications in the group according to a default policy and when the computer applications meet the condition of the default policy, setting the priority of the computer applications to a higher priority but less than the highest priority.

13. The computer program product of claim 12, wherein when the computer applications do not meet the condition of the default policy, setting the priority of the computer applications to a normal priority but less than the higher priority and the highest priority.

14. The computer program product of claim 13, wherein prioritizing the computer applications comprises scheduling computer resources to allocate the computer application according to the priority of the computer application in the order of highest priority first, higher priority second and normal priority third.

15. The computer program product of claim 14, wherein the computer resources comprise a central processing unit (CPU), a memory, a disk and network resources.

16. The computer program product of claim 9, wherein prioritizing the computer applications is repeated at least once.

17. A system for prioritizing resource allocation to computer applications comprising:
  a non-transitory storage medium that stores instructions; and
  a processor that executes the instructions to:

group the computer applications into groups according to an initial, predefined criteria, wherein each of the groups comprises two or more computer applications;

modify the groups according to one or more criteria used to identify foreground computer applications;

for each respective application:
  determine a foreground time for the respective application;
  determine a background time for the respective application; and
  calculate a total run time by adding the foreground time and the background time for the respective application;

for each respective group:
  calculate a total foreground time by adding the determined foreground times associated with the applications of the group;
  calculate a group total run-time by adding the calculated total run-times associated with the applications of the group; and
  calculate an average total run time by dividing the group total run time by the number of applications of the group;

analyze the groups to prioritize the groups in order of the total foreground time of the groups;

subsequent to the analyzing, for each prioritized group further ordering the computer applications in its respective group by prioritizing the computer applications in the groups in order of the foreground times of the computer applications in the groups;

set the highest priority for the computer applications that have a highest amount of foreground time over a predetermined time interval as measured by the total run time of the computer applications and a longest foreground time over the predetermined time interval as measured by the total run time of the computer applications;

prioritize the computer applications, according to the priority setting, while analyzing the total foreground time of all of the computer applications in the groups and analyzing the foreground time of the computer applications in the groups;

dynamically adjust the priority of the computer applications, according to the priority setting as determined in the prioritizing step;

dynamically adjust scheduling of the computer applications, according to the dynamically adjusted priority of the computer applications; and run the computer applications according to the dynamically adjusted scheduling of the computer applications.

18. The system of claim 17, wherein when the computer applications in set the highest priority do not meet the highest amount of foreground time over a predetermined time interval as measured by the total run time of the computer applications and the longest foreground time over the predetermined time interval as measured by the total run time of the computer applications, further analyze the groups and the computer applications in the group according to a default policy and when the computer applications meet the condition of the default policy, set the priority of the computer applications to a higher priority but less than the highest priority.

19. The system of claim 18, wherein when the computer applications do not meet the condition of the default policy, set the priority of the computer applications to a normal priority but less than the higher priority and the highest priority.

20. The system of claim 19, wherein a step to prioritize the computer applications comprises a further step to schedule computer resources to allocate the computer application according to the priority of the computer application in the order of highest priority first, higher priority second and normal priority third.

* * * * *